United States Patent
Takahashi et al.

(10) Patent No.: US 11,142,279 B2
(45) Date of Patent: Oct. 12, 2021

(54) BRAKE CONTROL DEVICE AND BRAKE SYSTEM

(71) Applicant: Shimano Inc., Osaka (JP)

(72) Inventors: Toshihiko Takahashi, Osaka (JP); Masahiko Fukuda, Osaka (JP); Hitoshi Takayama, Osaka (JP); Daisuke Nago, Osaka (JP); Masahiro Nakakura, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 176 days.

(21) Appl. No.: 16/255,423

(22) Filed: Jan. 23, 2019

(65) Prior Publication Data

US 2019/0225298 A1 Jul. 25, 2019

(30) Foreign Application Priority Data

Jan. 24, 2018 (JP) .............................. JP2018-009753

(51) Int. Cl.
*B62L 1/00* (2006.01)
*B62M 6/55* (2010.01)
*B62J 99/00* (2020.01)
*B62L 3/02* (2006.01)
*B62J 45/20* (2020.01)

(52) U.S. Cl.
CPC ............... *B62L 1/00* (2013.01); *B62J 99/00* (2013.01); *B62M 6/55* (2013.01); *B62J 45/20* (2020.02); *B62L 3/02* (2013.01)

(58) Field of Classification Search
CPC ..... B62L 1/00; B62L 3/02; B62J 99/00; B62J 50/20; B62J 45/20; B62J 6/045; B62M 6/55; B60W 30/18109; B60W 2510/18; B60W 2710/18; B60Y 2300/18108; B60Y 2400/81; B60G 2800/22; B60L 3/0076; B60L 3/108; B60T 2270/60; B60T 2270/602
See application file for complete search history.

(56) References Cited

U.S. PATENT DOCUMENTS

| 5,244,257 A | 9/1993 | Muller et al. |
| 5,445,443 A | 8/1995 | Hauser et al. |
| 6,547,343 B1 * | 4/2003 | Hac ...................... B60T 8/1755 303/140 |

(Continued)

FOREIGN PATENT DOCUMENTS

| CN | 103359090 A | 10/2013 |
| CN | 103661333 A | 3/2014 |

(Continued)

*Primary Examiner* — Ig T An
(74) *Attorney, Agent, or Firm* — Global IP Counselors, LLP

(57) ABSTRACT

A brake control device includes an electronic controller that controls a brake unit configured to brake a rotation body of a human-powered vehicle. The electronic controller limits ABS control in a case where a first predetermined condition for executing ABS control and a second predetermined condition for limiting ABS control are satisfied. The second predetermined condition is set based on limitation information that differs from information related to a traveling speed of the human-powered vehicle.

44 Claims, 3 Drawing Sheets

(56) References Cited

U.S. PATENT DOCUMENTS

| | | | | |
|---|---|---|---|---|
| 6,945,610 | B1* | 9/2005 | Mizutani | B60T 8/3275 303/114.1 |
| 7,695,075 | B1* | 4/2010 | Mackiewicz | B60T 8/173 303/191 |
| 8,958,935 | B2* | 2/2015 | Shoge | B62M 6/55 701/22 |
| 9,266,583 | B2* | 2/2016 | Getta | B62M 6/55 |
| 10,053,184 | B2* | 8/2018 | Tsuchizawa | B60L 50/20 |
| 10,259,311 | B2* | 4/2019 | Biderman | G07C 5/006 |
| 2003/0015916 | A1 | 1/2003 | Sakamoto | |
| 2005/0234622 | A1* | 10/2005 | Pillar | B60W 50/029 701/41 |
| 2007/0182529 | A1* | 8/2007 | Dobler | B60K 28/066 340/438 |
| 2007/0260376 | A1* | 11/2007 | Hattori | B60W 40/101 701/36 |
| 2009/0271072 | A1* | 10/2009 | Yamazaki | B62D 6/007 701/41 |
| 2012/0012412 | A1* | 1/2012 | Moeller | B62M 6/65 180/206.2 |
| 2012/0061169 | A1* | 3/2012 | Oblizajek | B62D 5/0472 180/446 |
| 2013/0041576 | A1* | 2/2013 | Switkes | G08G 1/22 701/123 |
| 2016/0318575 | A1* | 11/2016 | Shimoda | B62J 27/00 |
| 2020/0031334 | A1* | 1/2020 | Woodley | B60C 23/003 |
| 2020/0269949 | A1 | 8/2020 | Ikeda | |

FOREIGN PATENT DOCUMENTS

| | | |
|---|---|---|
| JP | 5-500485 A | 2/1993 |
| JP | 7-2077 A | 1/1995 |
| JP | 2003-25978 A | 1/2003 |
| JP | 2009-90774 A | 4/2009 |
| JP | 2011-121376 A | 6/2011 |
| JP | 2014-118143 A | 6/2014 |
| JP | 2016-203932 A | 12/2016 |
| JP | 2017-43332 A | 3/2017 |
| JP | 2017-109699 A | 6/2017 |
| JP | 2017-226390 A | 12/2017 |

* cited by examiner

BRAKE CONTROL DEVICE AND BRAKE SYSTEM

CROSS-REFERENCE TO RELATED APPLICATIONS

This application claims priority to Japanese Patent Application No. 2018-009753, filed on, Jan. 24, 2018. The entire disclosure of Japanese Patent Application No. 2018-009753 is hereby incorporated herein by reference.

BACKGROUND

Technical Field

The present invention generally relates to a brake control device and a braking system.

Background Information

Japanese Laid-Open Patent Publication No. 2016-203932 discloses a known brake control device applied to a human-powered vehicle. The brake control device executes Antilock Brake System (ABS) control to adjust a braking force acting on a rotation body of the human-powered vehicle, for example, in a case where a predetermined condition is satisfied.

SUMMARY

Depending on the situation under which the predetermined condition is satisfied, the execution of ABS control may not be desirable. In this respect, it is preferable that ABS control be executed at a preferred timing.

One object of the present disclosure is to provide a brake control device and a braking system that allows for ABS control to be executed at a preferred timing.

A brake control device in accordance with a first aspect of the present disclosure includes an electronic controller that is configured to control a brake unit configured to brake a rotation body of a human-powered vehicle. The electronic controller is further configured to limit an ABS control in a case where a first predetermined condition for executing the ABS control and a second predetermined condition for limiting the ABS control are satisfied. The second predetermined condition is set based on limitation information that differs from information related to a traveling speed of the human-powered vehicle.

Even if the first predetermined condition is satisfied, in a case where the second predetermined condition is satisfied, the execution of the ABS control will most likely be undesirable. The above brake control device limits the ABS control in a case where the first predetermined condition and the second predetermined condition are satisfied. Accordingly, the ABS control is executed at a preferred timing.

In accordance with a second aspect of the present disclosure, the brake control device according to the first aspect is configured so that the electronic controller is configured to limit the ABS control by not executing the ABS control in a case where the first predetermined condition and the second predetermined condition are satisfied.

Accordingly, the ABS control is executed at a preferred timing.

In accordance with a third aspect of the present disclosure, the brake control device according to the first or second aspect is configured so that the electronic controller is configured to execute the ABS control without adding limitations in a case where the first predetermined condition is satisfied, and the second predetermined condition is not satisfied.

Accordingly, the ABS control is executed at a preferred timing.

In accordance with a fourth aspect of the present disclosure, the brake control device according to any one of the first to third aspects is configured so that the limitation information includes information related to human-driven operation.

Depending on the human-driven operation, there are cases in which the execution of the ABS control will most likely be undesirable. With the brake control device, the second predetermined condition is set based on the information related to a human-driven operation so that the ABS control is limited in a preferred manner. Accordingly, the ABS control is executed at a preferred timing.

In accordance with a fifth aspect of the present disclosure, the brake control device according to the fourth aspect is configured so that the information related to human-driven operation includes at least one of cadence, power, and torque.

Accordingly, the ABS control is limited in a preferred manner.

In accordance with a sixth aspect of the present disclosure, the brake control device according to the fifth aspect is configured so that the information related to human-driven operation includes the cadence. In a case where the cadence is greater than or equal to a predetermined cadence, the electronic controller is configured to determine that the second predetermined condition is satisfied.

The electronic controller is configured to determine the second predetermined condition is satisfied in a case where the cadence is greater than or equal to a predetermined cadence. Accordingly, the ABS control is limited in a preferred manner.

In accordance with a seventh aspect of the present disclosure, the brake control device according to the fifth or sixth aspect is configured so that the information related to human-driven operation includes the power. The electronic controller is configured to determine the second predetermined condition is satisfied in a case where the power is greater than or equal to a predetermined power.

In a case where power is greater than or equal to the predetermined power, the execution of the ABS control will most likely be undesirable. Accordingly, the ABS control is limited in a preferred manner.

In accordance with an eighth aspect of the present disclosure, the brake control device according to any one of the fifth to seventh aspects is configured so that the information related to human-driven operation includes the torque. The electronic controller is configured to determine the second predetermined condition is satisfied in a case where the torque is greater than or equal to a predetermined torque.

In a case where the torque is greater than or equal to the predetermined torque, the execution of the ABS control will most likely be undesirable. Accordingly, the ABS control is limited in a preferred manner.

In accordance with a ninth aspect of the present disclosure, the brake control device according to any one of the first to eighth aspects is configured so that the limitation information includes information related to a vehicle state of at least one of orientation and position of the human-powered vehicle in relation to a state in which the human-powered vehicle is traveling straight and upright relative to the ground.

Depending on the vehicle state of the human-powered vehicle, there are cases in which the execution of the ABS control will most likely be undesirable. With the above brake control device, the second predetermined condition is set based on the information related to the vehicle state of the human-powered vehicle so that the ABS control is limited in a preferred manner. Accordingly, the ABS control is executed at a preferred timing.

In accordance with a tenth aspect of the present disclosure, the brake control device according to the ninth aspect is configured so that the information related to the vehicle state of at least one of orientation and position of the human-powered vehicle in relation to a state in which the human-powered vehicle is traveling straight and upright relative to the ground includes a steering angle of the human-powered vehicle.

Accordingly, the ABS control is limited in a preferred manner.

In accordance with an eleventh aspect of the present disclosure, the brake control device according to the tenth aspect is configured so that the electronic controller is configured to determine the second predetermined condition is satisfied in a case where the steering angle is greater than or equal to a predetermined steering angle.

In a case where the steering angle of the human-powered vehicle is greater than or equal to the predetermined steering angle, the execution of the ABS control will most likely be undesirable. Accordingly, the ABS control is limited in a preferred manner.

In accordance with a twelfth aspect of the present disclosure, the brake control device according to any one of the ninth to eleventh aspects is configured so that the information related to the vehicle state of at least one of orientation and position of the human-powered vehicle in relation to a state in which the human-powered vehicle is traveling straight and upright relative to the ground includes a slip angle of the human-powered vehicle.

Accordingly, the ABS control is limited in a preferred manner.

In accordance with a thirteenth aspect of the present disclosure, the brake control device according to the twelfth aspect is configured so that the electronic controller is configured to determine the second predetermined condition is satisfied in a case where the slip angle is greater than or equal to a predetermined slip angle.

In a case where the slip angle of the human-powered vehicle is greater than or equal to the predetermined slip angle, the execution of the ABS control will most likely be undesirable. Accordingly, the ABS control is limited in a preferred manner.

In accordance with a fourteenth aspect of the present disclosure, the brake control device according to any one of the ninth to thirteenth aspects is configured so that the information related to the vehicle state of at least one of orientation and position of the human-powered vehicle in relation to a state in which the human-powered vehicle is traveling straight and upright relative to the ground includes a lateral load of the human-powered vehicle.

Accordingly, the ABS control is limited in a preferred manner.

In accordance with a fifteenth aspect of the present disclosure, the brake control device according to the fourteenth aspect is configured so that the electronic controller is configured to determine the second predetermined condition is satisfied in a case where the lateral load is greater than or equal to a predetermined lateral load.

In a case where the lateral load of the human-powered vehicle is greater than or equal to the predetermined lateral load, the execution of the ABS control will most likely be undesirable. Accordingly, the ABS control is limited in a preferred manner.

In accordance with a sixteenth aspect of the present disclosure, the brake control device according to any one of the ninth to fifteenth aspects is configured so that the information related to the vehicle state of at least one of orientation and position of the human-powered vehicle in relation to a state in which the human-powered vehicle is traveling straight and upright relative to the ground includes a yaw angle of the human-powered vehicle.

Accordingly, the ABS control is limited in a preferred manner.

In accordance with a seventeenth aspect of the present disclosure, the brake control device according to the sixteenth aspect is configured so that the electronic controller is configured to determine the second predetermined condition is satisfied in a case where the yaw angle is greater than or equal to a predetermined yaw angle.

In a case where the yaw angle of the human-powered vehicle is greater than or equal to the predetermined yaw angle, the execution of the ABS control will most likely be undesirable. Accordingly, the ABS control is limited in a preferred manner.

In accordance with an eighteenth aspect of the present disclosure, the brake control device according to any one of the ninth to seventeenth aspects is configured so that the information related to the vehicle state of at least one of orientation and position of the human-powered vehicle in relation to a state in which the human-powered vehicle is traveling straight and upright relative to the ground includes a roll angle of the human-powered vehicle.

Accordingly, the ABS control is limited in a preferred manner.

In accordance with a nineteenth aspect of the present disclosure, the brake control device according to the eighteenth aspect is configured so that the electronic controller is configured to determine the second predetermined condition is satisfied in a case where the roll angle is greater than or equal to a predetermined roll angle.

In a case where the roll angle of the human-powered vehicle is greater than or equal to the predetermined roll angle, the execution of the ABS control will most likely be undesirable. Accordingly, the ABS control is limited in a preferred manner.

In accordance with a twentieth aspect of the present disclosure, the brake control device according to any one of the ninth to nineteenth aspects is configured so that the information related to the vehicle state of at least one of orientation and position of the human-powered vehicle in relation to a state in which the human-powered vehicle is traveling straight and upright relative to the ground includes a pitch angle of the human-powered vehicle.

Accordingly, the ABS control is limited in a preferred manner.

In accordance with a twenty-first aspect of the present disclosure, the brake control device according to the twentieth aspect is configured so that the electronic controller is configured to determine the second predetermined condition is satisfied in a case where the pitch angle is greater than or equal to a predetermined pitch angle.

In a case where the pitch angle of the human-powered vehicle is greater than or equal to the predetermined pitch angle, the execution of the ABS control will most likely be undesirable. Accordingly, the ABS control is limited in a preferred manner.

In accordance with a twenty-second aspect of the present disclosure, the brake control device according to any one of the ninth to twenty-first aspects is configured so that the information related to the vehicle state of at least one of orientation and position of the human-powered vehicle in relation to a state in which the human-powered vehicle is traveling straight and upright relative to the ground includes a vertical load of a wheel on which the rotation body is provided.

Accordingly, the ABS control is limited in a preferred manner.

In accordance with a twenty-third aspect of the present disclosure, the brake control device according to the twenty-second aspect is configured so that the electronic controller is configured to determine the second predetermined condition is satisfied in a case where the vertical load is less than or equal to a predetermined vertical load.

In a case where the vertical load of the human-powered vehicle is less than or equal to the predetermined vertical load, the execution of the ABS control will most likely be undesirable. Accordingly, the ABS control is limited in a preferred manner.

In accordance with a twenty-fourth aspect of the present disclosure, the brake control device according to any one of the first to twenty-third aspects is configured so that the limitation information includes information related to a traveling environment of the human-powered vehicle.

Depending on the traveling environment of the human-powered vehicle, there are cases in which the execution of the ABS control will most likely be undesirable. With the above brake control device, the second predetermined condition is set based on the information related to the traveling environment of the human-powered vehicle so that the ABS control is limited in a preferred manner. Accordingly, the ABS control is executed at a preferred timing.

In accordance with a twenty-fifth aspect of the present disclosure, the brake control device according to the twenty-fourth aspect is configured so that the information related to the traveling environment includes information related to a friction coefficient of a road surface.

Accordingly, the ABS control is limited in a preferred manner.

In accordance with a twenty-sixth aspect of the present disclosure, the brake control device according to the twenty-fifth aspect is configured so that the electronic controller is configured to determine the second predetermined condition is satisfied in a case where the friction coefficient is less than or equal to a predetermined the friction coefficient.

In a case where the friction coefficient of the road surface is less than or equal to the predetermined friction coefficient, the execution of the ABS control will most likely be undesirable. Accordingly, the ABS control is limited in a preferred manner.

In accordance with a twenty-seventh aspect of the present disclosure, the brake control device according to any one of the twenty-fourth to twenty-sixth aspects is configured so that the information related to the traveling environment includes information related to the weather.

Accordingly, the ABS control is limited in a preferred manner.

In accordance with a twenty-eighth aspect of the present disclosure, the brake control device according to the twenty-seventh aspect is configured so that the electronic controller is configured to determine the second predetermined condition is satisfied in a case where the weather is a predetermined weather.

In a case where the weather is the predetermined weather, the execution of the ABS control will most likely be undesirable. Accordingly, the ABS control is limited in a preferred manner.

In accordance with a twenty-ninth aspect of the present disclosure, the brake control device according to any one of the twenty-fourth to twenty-eighth aspects is configured so that the information related to the traveling environment includes information related to an amplitude of the road surface.

Accordingly, the ABS control is limited in a preferred manner.

In accordance with a thirtieth aspect of the present disclosure, the brake control device according to the twenty-ninth aspect is configured so that the electronic controller is configured to determine the second predetermined condition is satisfied in a case where the amplitude is greater than or equal to a predetermined amplitude.

In a case where the amplitude of the road surface is greater than or equal to the predetermined amplitude, the execution of the ABS control will most likely be undesirable. Accordingly, the ABS control is limited in a preferred manner.

In accordance with a thirty-first aspect of the present disclosure, the brake control device according to any one of the first to thirties aspects is configured so that the limitation information includes information related to a component of the human-powered vehicle.

Depending on a state of a component of the human-powered vehicle, there are cases in which the execution of the ABS control will most likely be undesirable. With the above brake control device, the second predetermined condition is set based on the information related to a component so that the ABS control is limited in a preferred manner. Accordingly, the ABS control is executed at a preferred timing.

In accordance with a thirty-second aspect of the present disclosure, the brake control device according to the thirty-first aspect is configured so that the information related to a component includes information related to a state of charge of a battery.

Accordingly, the ABS control is limited in a preferred manner.

In accordance with a thirty-third aspect of the present disclosure, the brake control device according to the thirty-second aspect is configured so that the electronic controller is configured to determine the second predetermined condition is satisfied in a case where the state of charge of a battery is less than or equal to a predetermined state of charge.

In a case where the state of charge of the battery is less than or equal to the predetermined state of charge, the execution of the ABS control will most likely be undesirable. Accordingly, the ABS control is limited in a preferred manner.

In accordance with a thirty-fourth aspect of the present disclosure, the brake control device according to any one of the thirty-first to thirty-third aspects is configured so that the information related to a component includes information related to an abnormality of the component.

Accordingly, the ABS control is limited in a preferred manner.

In accordance with a thirty-fifth aspect of the present disclosure, the brake control device according to the thirty-fourth aspect is configured so that the electronic controller is configured to determine the second predetermined condition is satisfied in a case where the component is in an abnormal state.

In a case where the component is in an abnormal state, the execution of the ABS control will most likely be undesirable. Accordingly, the ABS control is limited in a preferred manner.

In accordance with a thirty-sixth aspect of the present disclosure, the brake control device according to any one of the thirty-first to thirty-fifth aspects is configured so that the information related to a component includes information related to an air pressure of a tire.

Accordingly, the ABS control is limited in a preferred manner.

In accordance with a thirty-seventh aspect of the present disclosure, the brake control device according to the thirty-sixth aspect is configured so that the electronic controller is configured to determine the second predetermined condition is satisfied in a case where the air pressure of the tire is less than or equal to a predetermined air pressure.

In a case where the air pressure of the tire is less than or equal to the predetermined air pressure, the execution of the ABS control will most likely be undesirable. Accordingly, the ABS control is limited in a preferred manner.

In accordance with a thirty-eighth aspect of the present disclosure, the brake control device according to any one of the thirty-first to thirty-seventh aspects is configured so that the information related to a component includes information related to a flat tire of the human-powered vehicle.

Accordingly, the ABS control is limited in a preferred manner.

In accordance with a thirty-ninth aspect of the present disclosure, the brake control device according to the thirty-eighth aspect is configured so that in a case where the tire is flat, the electronic controller is configured to determine the second predetermined condition is satisfied in a case where the tire is flat.

In a case where the tire is flat, the execution of the ABS control will most likely be undesirable. Accordingly, the ABS control is limited in a preferred manner.

In accordance with a fortieth aspect of the present disclosure, the brake control device according to any one of the thirty-first to thirty-ninth aspects is configured so that the information related to a component includes information related to a friction member of the brake unit.

Accordingly, the ABS control is limited in a preferred manner.

In accordance with a forty-first aspect of the present disclosure, the brake control device according to the fortieth aspect is configured so that the electronic controller is configured to determine the second predetermined condition is satisfied in a case where the friction member has a thickness that is less than or equal to a predetermined thickness.

In a case where the friction member has the thickness that is less than or equal to the predetermined thickness, the execution of the ABS control will most likely be undesirable. Accordingly, the ABS control is limited in a preferred manner.

In accordance with a forty-second aspect of the present disclosure, the brake control device according to any one of the first to forty-first aspects is configured so that the limitation information includes information related to a condition of a user.

Depending on the condition of a user riding the human-powered vehicle, there are cases in which the execution of the ABS control will most likely be undesirable. With the above brake control device, the second predetermined condition is set based on the information related to the condition of a user so that the ABS control is limited in a preferred manner. Accordingly, the ABS control is executed at a preferred timing.

In accordance with a forty-third aspect of the present disclosure, the brake control device according to the forty-second aspect is configured so that the information related to the condition of a user includes information related to the heart rate of the user.

Accordingly, the ABS control is limited in a preferred manner.

In accordance with a forty-fourth aspect of the present disclosure, the brake control device according to the forty-third aspect is configured so that the electronic controller is configured to determine the second predetermined condition is satisfied in a case where the heart rate is greater than or equal to a predetermined heart rate.

In a case where the heart rate is greater than or equal to the predetermined heart rate, the execution of the ABS control will most likely be undesirable. Accordingly, the ABS control is limited in a preferred manner.

In accordance with a forty-fifth aspect of the present disclosure, the brake control device according to any one of the first to forty-fourth aspects is configured so that the electronic controller is configured to determine the first predetermined condition is satisfied in a case where a slip rate of a wheel on which the rotation body is provided is greater than or equal to a predetermined slip rate.

Accordingly, the ABS control is executed so as to brake the rotation body and reduce slipping of the wheel.

A braking system according to the forty-sixth aspect of the present disclosure includes the brake control device according to any one of the first to forty-fifth aspects, and further includes the brake unit, and an electric drive unit configured to drive the brake unit.

Even if the first predetermined condition is satisfied, in a case where the second predetermined condition is satisfied, the execution of the ABS control will most likely be undesirable. The above braking system limits the ABS control in a case where the first predetermined condition and the second predetermined condition are satisfied. Accordingly, the ABS control is executed at a preferred timing.

In accordance with a forty-seventh aspect of the present disclosure, the braking system according to the forty-sixth aspect further includes an electric assist unit configured to assist propulsion of the human-powered vehicle.

Accordingly, the braking system is applicable to the human-powered vehicle including the electric assist unit.

With the brake control device and the braking system in accordance with the present disclosure, the ABS control is executed at a preferred timing.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three, Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

Embodiments

Figure 1:
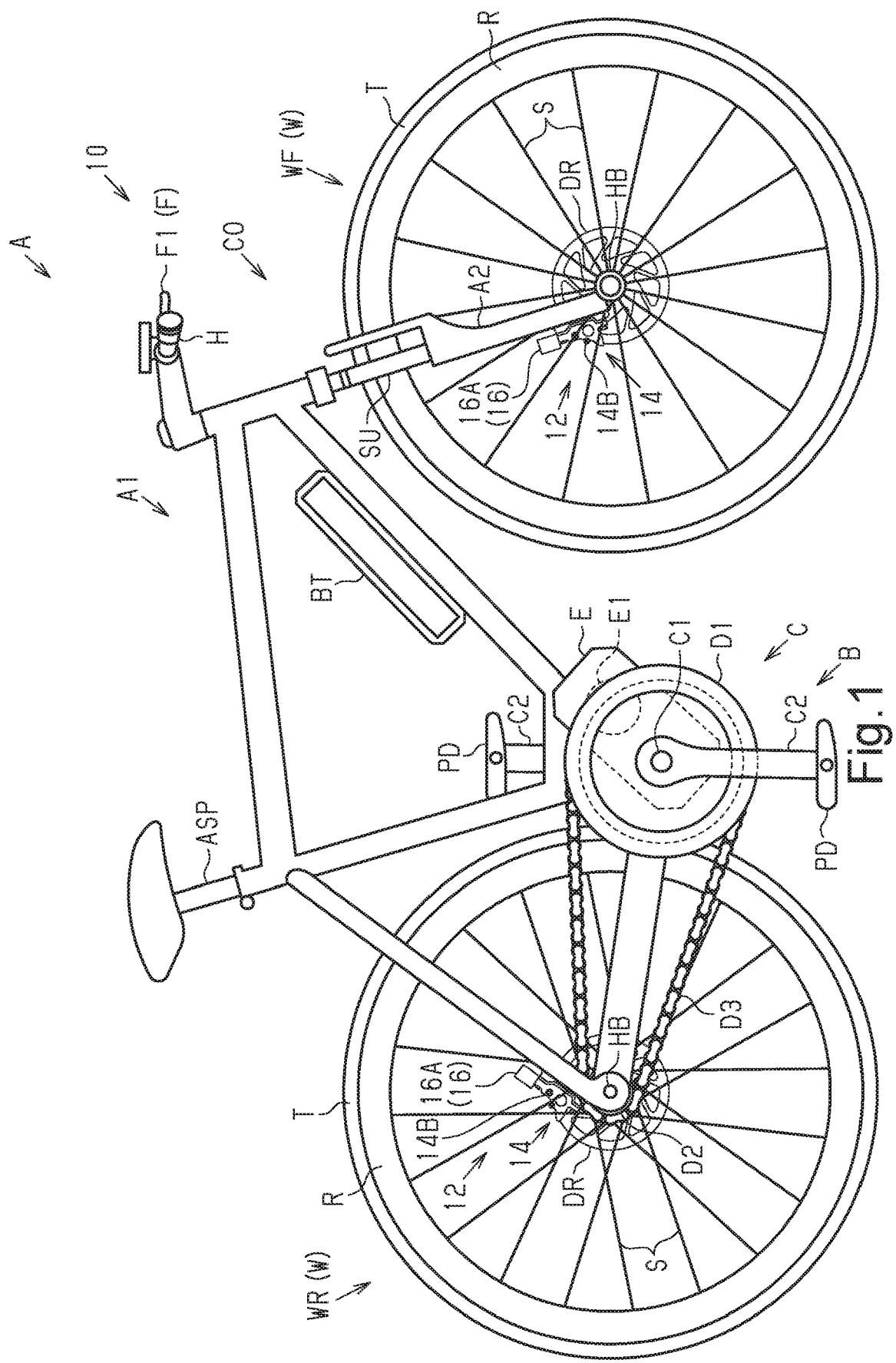
FIG. 1 is a side elevational view of a human-powered vehicle equipped with a braking system in accordance with one embodiment.

A human-powered vehicle A including a braking system 10 will now be described with reference with FIG. 1. The human-powered vehicle refers to a vehicle that at least partially uses human force as a prime mover for traveling and includes a vehicle that assists human force with electric power. The human-powered vehicle does not include vehicles using only a prime mover that is not human force. In particular, the human-powered vehicle does not include a vehicle that only uses an internal combustion engine as the prime mover. The human-powered vehicle is a compact light vehicle that does not require a license for driving on a public road. The illustrated human-powered vehicle A is a bicycle (e-bike) including an electric assist unit E that assists propulsion of the human-powered vehicle A by using electric energy. Specifically, the illustrated human-powered vehicle A is a trekking bike.

The human-powered vehicle A further includes a frame A1, a front fork A2, wheels W, a handle H, and a drive train B. The wheels W include a front wheel WF and a rear wheel WR. In the present embodiment, the front wheel WF includes a tire T, a rim R, a plurality of spokes S, a hub HB, and a disc brake rotor DR. The rear wheel WR includes a structure practically same as that of the front wheel WF.

The drive train B is configured as a chain drive type. The drive train B includes a crank C, a front sprocket D1, a rear sprocket D2, and a chain D3. The crank C includes a crankshaft C1 and two crank arms C2. The crankshaft C1 is rotatably supported by the frame A1. The crank arms C2 are each provided on one of the ends of the crankshaft C1, respectively. A pedal PD is rotatably coupled to a distal end of each of the crank arms C2. The drive train B can be of any type, and can be of a belt drive type or a shaft drive type.

The front sprocket D1 is provided on the crank C so as to rotate integrally with the crank shaft C1. The rear sprocket D2 is provided on the hub HB of the rear wheel WR. The chain D3 is wound around the front sprocket D1 and the rear sprocket D2. The driving force added to the pedals PD by a user riding the human-powered vehicle A is transmitted via the front sprocket D1, the chain D3, and the rear sprocket D2 to the rear wheel WR.

The braking system 10 includes the electric assist unit E. The electric assist unit E functions to assist propulsion of the human-powered vehicle A. The electric assist unit E functions, for example, in accordance with the driving force added to the pedals PD. The electric assist unit E includes an electric motor E1. The electric assist unit E is driven by electric power supplied from a battery BT mounted on the human-powered vehicle A. The battery BT is provided on an exterior surface of the frame A1. The battery BT can be at least partially accommodated inside the frame A1. The electric assist unit E can be omitted from the braking system 10.

The braking system 10 further includes a plurality of brake devices 12, the number of which corresponds to the number of the wheels. In the present embodiment, the braking system 10 includes the brake device 12 that is provided for the front wheel WF and the brake device 12 that is provided for the rear wheel WR. The two brake devices 12 have the same structure. In the present embodiment, the brake devices 12 are disc brake devices that brake rotation bodies of the human-powered vehicle A. The rotation bodies are the disc brake rotors DR (hereafter, also referred to as "the rotation bodies DR") provided on the front wheel WF and the rear wheel WR of the human-powered vehicle A. Each of the brake devices 12 can be a rim brake device. In this case, the rotation body is the rim R.

The braking system 10 further includes a plurality of brake units 14 and a plurality of electric drive units 16. The brake units 14 are configured to brake the rotation bodies DR of the human-powered vehicle A. The electric drive units 16 are configured to drive the brake units 14. In the present embodiment, each of the brake devices 12 includes the brake unit 14 and the electric drive unit 16. Each of the brake unit 14 includes a friction member 14A (refer to FIG. 2) and a caliper 14B. The friction member 14A is configured to contact the rotation body DR. The caliper 14B holds the corresponding rotation body DR with the friction member 14A. The brake unit 14 is, for example, electrically driven by the electric drive unit 16 to brake the rotation body DR. Specifically, the caliper 14B is electrically driven so that the friction member 14A contacts the rotation body DR. The contact of the friction member 14A with the rotation body DR brakes the rotation body DR. Each of the electric drive units 16 includes an electric motor 16A. The electric drive unit 16 is electrically driven, for example, by electric power supplied from the battery BT. In the present embodiment, the electric drive unit 16 is provided on the caliper 14B.

The braking system 10 further includes a plurality of operation devices F. The operation devices F are provided on a right side of the handle H and a left side of the handle H with respect to a center plane of the human-powered vehicle A. Each of the operation devices F includes a lever F1 that is operable by a user. The brake devices 12 are mechanically or electrically driven in accordance with operation of the levers F1 of the operation devices F. In the present embodiment, operation of the lever F1 of one of the operation devices F electrically drives a corresponding one of the brake devices 12. Further, operation of the lever F1 of the other one of the operation devices F electrically drives the other one of the brake devices 12. In this case, a braking force ratio of the brake devices 12 for one of the operation devices F can differ from a braking force ratio of the brake devices 12 for the other one of the operation devices F.

The human-powered vehicle A further includes a component OC. The component OC includes at least one of a transmission (not shown), the electric assist unit E, a suspension SU, an adjustable seat post ASP, and the brake device 12. These components OC are driven by electric power supplied from the battery BT, which is mounted on the human-powered vehicle A, or a dedicated electric power supply (not shown).

Figure 2:
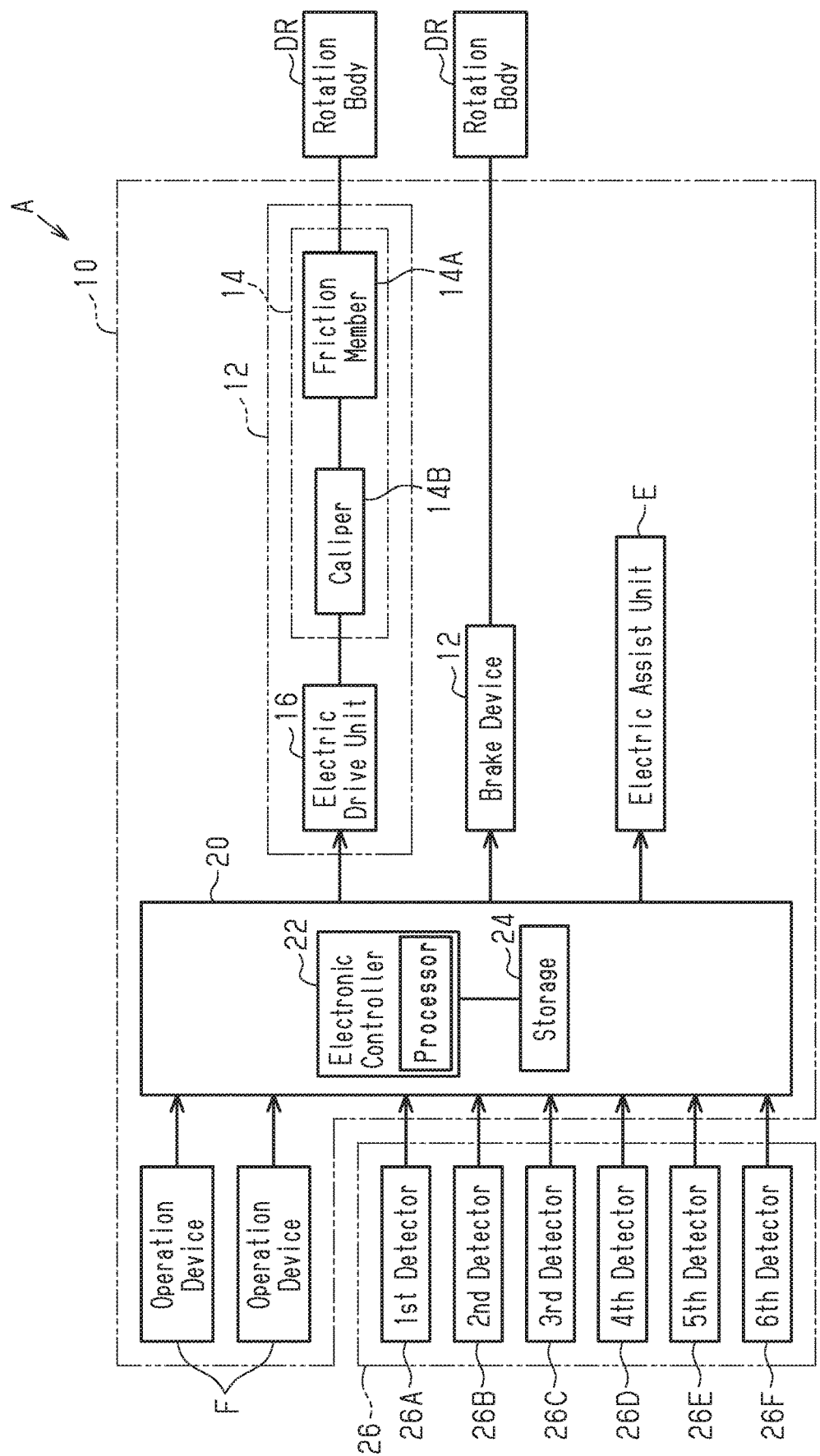
FIG. 2 is a block diagram diagrammatically showing the braking system in FIG. 1.

As shown in FIG. 2, the braking system 10 further includes a brake control device 20. The brake control device 20 is driven, for example, by electric power supplied from the battery BT. The brake control device 20 includes an electronic controller 22 that controls the brake units 14 configured to brake the rotation bodies DR of the human-powered vehicle A. The electronic controller 22 is a Central Processing Unit (CPU) or a Micro Processing Unit (MPU). The electronic controller 12 is preferably a microcomputer that includes one or more processors. The electronic controller 12 is formed of one or more semiconductor chips that are mounted on a printed circuit board. The term "electronic controller" as used herein refers to hardware that executes a software program. The electronic controller 22 controls the electric drive units 16 in order to control the brake units 14. The electronic controller 22 can control the components CO including the electric assist unit E. The brake control device 20 further includes a storage 24. The storage 24 is any computer storage device or any computer readable medium with the sole exception of a transitory, propagating signal. The storage 24 includes a non-volatile memory and a volatile memory. The storage 24 stores, for example, various programs for control processes and preset information. The information stored in the storage 24 in advance can be modified by using a predetermined input device (not shown).

The electronic controller 22 limits ABS control in a case where a first predetermined condition for executing ABS control and a second predetermined condition for limiting ABS control are satisfied. The ABS control is a control that adjusts the braking force acting on the rotation bodies DR in a state in which the brake units 14 brake the rotation bodies DR of the human-powered vehicle A. Specifically, in a case where the ABS control is executed, the electronic controller 22 controls the brake units 14 to adjust the braking force acting on the rotation bodies DR. More specifically, in a case where the ABS control is executed, the electronic controller 22 controls the brake units 14 to reduce the braking force acting on the rotation bodies DR. The limiting of the ABS control includes limiting execution of the ABS control so that the ABS control is executed less frequently, limiting execution of the ABS control so that the ABS control is executed with a lower strength, and limiting execution of the ABS control so that the ABS control is not executed. The limiting of the execution of the ABS control so that the ABS control is executed less frequently includes changing a threshold value used for the first predetermined condition (in the present embodiment, predetermined slip rate, which will be described later). The limiting of the execution of the ABS control so that the ABS control is executed with a lower strength includes, in a case where the ABS control is executed, decreasing an adjustment amount of the braking force acting on the rotation bodies DR from a case where the second predetermined condition is not satisfied. In the present embodiment, in a case where the first predetermined condition and the second predetermined condition are satisfied, the electronic controller 22 does not execute the ABS control. In a case where the first predetermined condition is satisfied and the second predetermined condition is not satisfied, the electronic controller 22 executes the ABS control without adding limitations.

The first predetermined condition is determined, for example, based on the slip rate of the wheel W. In a case where the slip rate of the wheel W on which the rotation body DR is provided is higher than or equal to a predetermined slip rate, it is determined that the first predetermined condition is satisfied. For example, the slip rate of the wheel W can be obtained based on the difference between rotational speeds of the front wheel WF and the rear wheel WR of the human-powered vehicle A. In the present embodiment, the processes executed by the electronic controller 22 include the determination of whether or not the first predetermined condition is satisfied. The second predetermined condition is set based on limitation information that differs from information related to a traveling speed of the human-powered vehicle A. The limitation information includes at least one of a first limitation information, a second limitation information, a third limitation information, a fourth limitation information, and a fifth limitation information.

The first limitation information includes information related to human-driven operation. The human-driven operation is, for example, an input to the crank C of the human-powered vehicle A. The information related to the human-driven operation includes at least one of cadence, power, and torque. In a case where the cadence is greater than or equal to a predetermined cadence, it is determined that the second predetermined condition is satisfied. In a case where the cadence is greater than or equal to the predetermined cadence, for example, this indicates that a user is pedaling the pedals PD. The information related to the predetermined cadence is stored in the storage 24 in advance. In the present embodiment, the processes executed by the electronic controller 22 include the determination of whether or not the second predetermined condition is satisfied. In a case where the power is greater than or equal to a predetermined power, it is determined that the second predetermined condition is satisfied. In a case where the power is greater than or equal to the predetermined power, for example, this indicates that a user is pedaling the pedals PD. The information related to the predetermined power is stored in the storage 24 in advance. In a case where the torque is greater than or equal to a predetermined torque, it is determined that the second predetermined condition is satisfied. In a case where the torque is greater than or equal to the predetermined torque, for example, this indicates that a user is pedaling the pedals PD. The information related to the predetermined torque is stored in the storage 24 in advance.

The second limitation information includes information related to a vehicle state of at least one of orientation and position of the human-powered vehicle A in relation to a state in which the human-powered vehicle A is traveling straight and upright relative to the ground. The vehicle state of the human-powered vehicle A is a vehicle state of the human-powered vehicle A with respect to a road surface (not shown) such as the ground with which the wheels W contact. The information related to the vehicle state of the human-powered vehicle A includes a steering angle of the human-powered vehicle A. In a case where the steering angle is greater than or equal to a predetermined steering angle, it is determined that the second predetermined condition is satisfied. In a case where the steering angle is greater than or equal to the predetermined steering angle, for example, this indicates that the human-powered vehicle A is turning. The information related to the steering angle is stored in the storage 24 in advance. The information related to the vehicle state of the human-powered vehicle A includes a slip angle of the human-powered vehicle A. In a case where the slip angle is greater than or equal to a predetermined slip angle, it is determined that the second predetermined condition is satisfied. In a case where the slip angle is greater than or equal to the predetermined slip angle, for example, this indicates that the human-powered vehicle A is turning. The information related to the predetermined slip angle is stored in the storage 24 in advance.

The information related to the vehicle state of the human-powered vehicle A includes a lateral load on the human-powered vehicle A. The lateral load is, for example, a load applied to the side of the human-powered vehicle A in a case where the human-powered vehicle A is turning. In a case where the lateral load is greater than or equal to a predetermined lateral load, it is determined that the second predetermined condition is satisfied. In a case where the lateral load is greater than or equal to the predetermined lateral load, for example, this indicates that the human-powered vehicle A is turning. The information related to the predetermined lateral load is stored in the storage 24 in advance. The information related to the vehicle state of the human-powered vehicle A includes a yaw angle of the human-powered vehicle A. In a case where the yaw angle is greater than or equal to a predetermined yaw angle, it is determined that the second predetermined condition is satisfied. In a case where the yaw angle is greater than or equal to the predetermined yaw angle, for example, this indicates that the human-powered vehicle is turning. The information related to the predetermined yaw angle is stored in the storage 24 in advance. The information related to the vehicle state of the human-powered vehicle A includes a roll angle of the human-powered vehicle A. In a case where the roll angle is greater than or equal to a predetermined roll angle, it is determined that the second predetermined condition is satisfied. In a case where the roll angle is greater than or equal to the predetermined roll angle, for example, this indicates that the human-powered vehicle A is turning. The information related to the predetermined roll angle is stored in the storage 24 in advance.

The information related to the vehicle state of the human-powered vehicle A includes a pitch angle of the human-powered vehicle A. In a case where the pitch angle is greater than or equal to a predetermined pitch angle, it is determined that the second predetermined condition is satisfied. In a case where the pitch angle is greater than or equal to the predetermined pitch angle, for example, this indicates that the front wheel WF or the rear wheel WR of the human-powered vehicle A is lifted from the road surface. The information related to the predetermined pitch angle is stored in the storage 24 in advance. The information related to the vehicle state of the human-powered vehicle A includes a vertical load on the wheel W on which the rotation body DR is provided. In a case where the vertical load is less than or equal to a predetermined vertical load, it is determined that the second predetermined condition is satisfied. In a case where the vertical load is less than or equal to the predetermined vertical load, for example, this indicates that the front wheel WF or the rear wheel WR of the human-powered vehicle A is lifted from the road surface. The information related to the predetermined vertical load is stored in the storage 24 in advance. In the present embodiment, the information related to the vehicle state of the human-powered vehicle A includes at least one of the steering angle, the slip angle, the lateral load, the yaw angle, the roll angle, the pitch angle, and the vertical load.

The third limitation information includes information related to a traveling environment of the human-powered vehicle A. The information related to the traveling environment includes information related to a friction coefficient of the road surface. In a case where the friction coefficient is less than or equal to a predetermined friction coefficient, it is determined that the second predetermined condition is satisfied. In a case where the friction coefficient is less than or equal to the predetermined friction coefficient, for example, this indicates that the road surface is wet. The information related to the predetermined friction coefficient is stored in the storage 24 in advance. The information related to the traveling environment includes information related to the weather. In a case where the weather is a predetermined weather, it is determined that the second predetermined condition is satisfied. In a case where the weather is the predetermined weather, for example, this indicates that the road surface is wet. The information related to the predetermined weather is stored in the storage 24 in advance. The information related to the traveling environment includes information related to an amplitude of the road surface. In a case where the amplitude is greater than or equal to a predetermined amplitude, it is determined that the second predetermined condition is satisfied. In a case where the amplitude is greater than or equal to the predetermined amplitude, for example, this indicates that the human-powered vehicle A is rattling. The information related to the predetermined amplitude is stored in the storage 24 in advance. In the present embodiment, the information related to the traveling environment includes at least one of information related to the friction coefficient of the road surface, information related to the weather, and information related to the amplitude of the road surface.

The fourth limitation information includes information related to a component CO of the human-powered vehicle A. The information related to a component CO includes information related to a state of charge of the battery BT. In a case where the state of charge of the battery BT is less than or equal to a predetermined state of charge, it is determined that the second predetermined condition is satisfied. In a case where the state of charge of the battery BT is less than or equal to the predetermined state of charge, for example, this indicates that the ABS control is not likely to be executed properly. The information related to the predetermined state of charge is stored in the storage 24 in advance. The information related to a component CO includes information related to an abnormality of the component CO. In a case where the component CO is in an abnormal state, it is determined that the second predetermined condition is satisfied. In a case where the component CO is in an abnormal state, for example, this indicates that the ABS control is not likely to be executed properly. The information related to a component CO includes information related to an air pressure of the tire T. In a case where the air pressure of the tire T is less than or equal to a predetermined air pressure, it is determined that the second predetermined condition is satisfied. In a case where the air pressure of the tire T is less than or equal to the predetermined air pressure, for example, this indicates that the human-powered vehicle A is rattling. The information related to the predetermined air pressure is stored in the storage 24 in advance.

The information related to a component CO includes information related to a flat tire T of the human-powered vehicle A. In a case where the tire T is flat, it is determined that the second predetermined condition is satisfied. In a case where the tire T is flat, for example, this indicates that the human-powered vehicle A is rattling. In a case where the tire T is flat, the air pressure of the tire T is zero. The information related to a component CO includes information related to the friction member 14A of the brake unit 14. In a case where the friction member 14A has a thickness that is less than or equal to a predetermined thickness, it is determined that the second predetermined condition is satisfied. In a case where the friction member 14A has the thickness that is less than or equal to the predetermined thickness, for example, this indicates that the ABS control is not likely to be executed properly. The information related to the predetermined thickness is stored in the storage 24 in advance. In the present embodiment, the information related to a component CO includes at least one of the information related to the state of charge of the battery BT, the information related to an abnormality of the component CO, the information related to the air pressure of the tire T, the information related to the flat tire T, and the information related to the friction member 14A.

The fifth limitation information includes information related to a condition of a user. The information related to the condition of a user includes information related to the heart rate of a user. In a case where the heart rate is greater than or equal to a predetermined heart rate, it is determined that the second predetermined condition is satisfied. In a case where the heart rate is greater than or equal to the predetermined heart rate, for example, this indicates that the user is not in a stable state of mind. The information related to the predetermined heart rate is stored in the storage 24 in advance. The information related to the condition of a user includes information related to volume of voice of a user. In a case where the volume of voice is greater than or equal to a predetermined volume of voice, it is determined that the second predetermined condition is satisfied. In a case where the volume of voice is greater than or equal to the predetermined heart rate, for example, this indicates that the user is not in a stable state of mind. The information related to the predetermined volume of voice is stored in the storage 24 in advance.

The information related to the condition of a user includes information related to a perspiration amount of a user. In a case where the perspiration amount is greater than or equal to a predetermined perspiration amount, it is determined that the second predetermined condition is satisfied. In a case where the perspiration amount is greater than or equal to the predetermined perspiration amount, for example, this indicates that the user is not in a stable state of mind. The information related to the predetermined perspiration amount is stored in the storage 24 in advance. The information related to the condition of a user includes information related to the brain wave of a user. In a case where the brain wave has an abnormality, it is determined that the second predetermined condition is satisfied. In a case where the brain wave has an abnormality, for example, this indicates that the user is not in a stable state of mind. The information related to the condition of a user includes information related to the blood flow of a user. In a case where the blood flow has an abnormality, it is determined that the second predetermined condition is satisfied. In a case where the blood flow has an abnormality, for example, this indicates that the user is not in a stable state of mind. The information related to the condition of a user includes at least one of the information related to the heart rate, the information related to the volume of voice, the information related to the perspiration amount, the information related to the brain wave, and the information related to the blood flow.

The limitation information can further include at least one of information related to a total weight of the human-powered vehicle A and information related to a vehicle body specification of the human-powered vehicle A. The total weight of the human-powered vehicle A includes the weight of the human-powered vehicle A, the weight of a user, the weight of a basket and a carrier (not shown) of the human-powered vehicle A, and the like. In one example, in a case where the total weight is less than or equal to a predetermined total weight, it is determined that the second predetermined condition is satisfied. The information related to the predetermined total weight is stored in the storage 24 in advance. The vehicle body specification of the human-powered vehicle A includes specifications of the frame A1, specifications of the components CO, and the like. In one example, in a case where the vehicle body specifications are predetermined vehicle body specifications, it is determined that the second predetermined condition is satisfied. The information related to the predetermined specifications is stored in the storage 24 in advance.

The human-powered vehicle A further includes a detection unit 26 that detects various information. The detection unit 26 includes at least one of a first detector 26A, a second detector 26B, a third detector 26C, a fourth detector 26D, a fifth detector 26E, and a sixth detector 26F. The detection unit 26 can detect various types of information in a state in which the levers F1 of the operation devices F are operated. Alternatively, the detection unit 26 can detect various types of information in predetermined time intervals. For example, the detection unit 26 outputs the detected limitation information to the brake control device 20. The term "detector" is a device(s) that detects information relating to the human-powered vehicle A and does not include a human.

The first detector 26A detects the first limitation information. The first detector 26A includes, for example, various sensors (not shown) that detect at least one of cadence, power, and torque. The first detector 26A outputs the obtained first limitation information to the electronic controller 22. The second detector 26B detects the second limitation information. The second detector 26B includes, for example, various sensors (not shown) that detect at least one of a steering angle, a slip angle, a lateral load, a yaw angle, a roll angle, a pitch angle, and a vertical load. The second detector 26B outputs the obtained second limitation information to the electronic controller 22.

The third detector 26C detects the third limitation information. The third detector 26C includes, for example, at least one of various sensors and a receiver (not shown). The sensors detect at least one of information related to a friction coefficient of the road surface and information related to an amplitude of ups and downs of the road surface. The receiver detects information related to the weather from an external device. The third detector 26C outputs the obtained third limitation information to the electronic controller 22. The fourth detector 26D detects the fourth limitation information. The fourth detector 26D includes, for example, various sensors (not shown) that detect at least one of information related to the state of charge of the battery BT, information related to an abnormality of the component CO, information related to the air pressure of the tire T, information related to a flat tire T, and information related to the friction member 14A. The fourth detector 26D outputs the obtained fourth limitation information to the electronic controller 22.

The fifth detector 26E detects the fifth limitation information. The fifth detector 26E includes, for example, various sensors (not shown) that detect at least one of information related to the heart rate, information related to a volume of voice, information related to a perspiration amount, information related to the brain wave, and information related to the blood flow. The fifth detector 26E outputs the obtained fifth limitation information to the electronic controller 22. The sixth detector 26F detects a slip rate of the wheel W. The sixth detector 26F includes, for example, various sensors (not shown) that detect a slip rate of the wheel W. The sixth detector 26F outputs the obtained information related to the slip rate of the wheel W to the electronic controller 22. The detectors 26A to 26E that do not detect information that is included in the limitation information, which determines the second predetermined condition, can be omitted from the detection unit 26.

Figure 3:
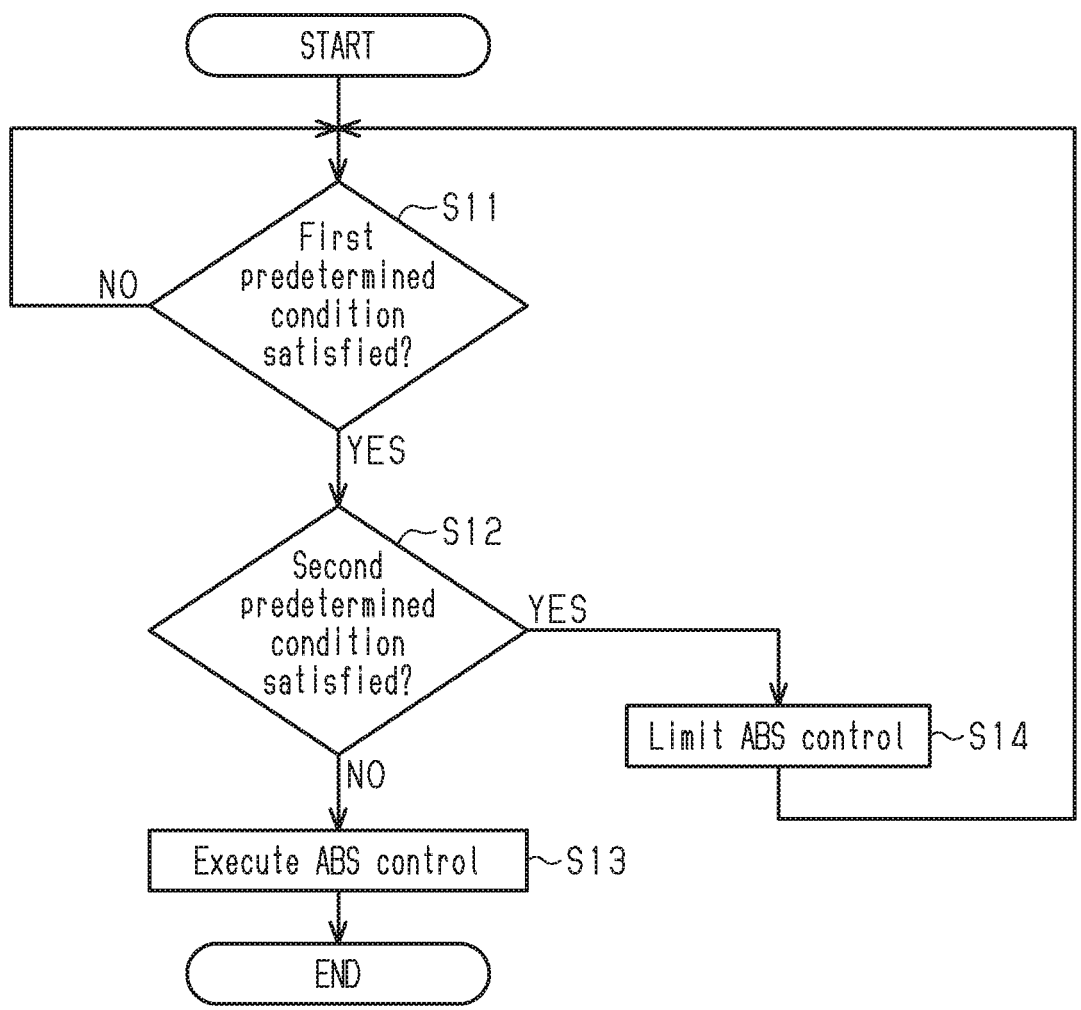
FIG. 3 is a flowchart illustrating one modification of a control executed by a brake control device in FIG. 2.

One example of a control executed by the electronic controller 22 will now be described with reference to FIG. 3.

In step S11, the electronic controller 22 determines whether or not the first predetermined condition has been satisfied. Specifically, the electronic controller 22 determines whether or not the first predetermined condition has been satisfied based on the slip rate of the wheel W obtained from the sixth detector 26F. In step S11, in a case where it is determined that the first predetermined condition has not been satisfied, the electronic controller 22 repeats the process of step S11. In a case where it is determined that the first predetermined condition has been satisfied in step S11, the electronic controller 22 proceeds to the process of step S12.

In step S12, the electronic controller 22 determines whether or not the second predetermined condition has been satisfied. Specifically, the electronic controller 22 determines whether or not the second predetermined condition has been satisfied based on the limitation information obtained from the detectors 26A to 26E. In step S12, in a case where it is determined that the second predetermined condition has not been satisfied, the electronic controller 22 proceeds to step S13. In step S13, the electronic controller 22 executes ABS control without adding limitations.

In a case where it is determined that the second predetermined condition has been satisfied in step S12, the electronic controller proceeds to step S14. In step S14, the electronic controller 22 limits ABS control. In the present embodiment, the electronic controller 22 does not execute ABS control in step S14. After the process of step S14 is performed, the electronic controller 22 returns to step S11. As described above, the brake control device 20 limits ABS control in a case where the first predetermined condition and the second predetermined condition are satisfied. Accordingly, ABS control is executed at a preferred timing. The order of the processes of step S11 and step S12 can be changed.

Modifications

The description related with the above embodiment exemplifies, without any intention to limit, an applicable form of a brake control device and a braking system according to the present invention. In addition to the embodiment described above, the brake control device and the braking system according to the present invention are applicable to, for example, modifications of the above embodiments that are described below and combinations of at least two of the modifications that do not contradict each other. In the modifications described hereafter, same reference numerals are given to those components that are the same as the corresponding components of the above embodiment. Such components will not be described in detail.

The relationship between the limitation information and the threshold values used for the second predetermined condition can be modified. In a first modification, in a case where the cadence is less than the predetermined cadence, it is determined that the second predetermined condition is satisfied. In a second modification, in a case where the power is less than the predetermined power, it is determined that the second predetermined condition is satisfied. In a third modification, in a case where the torque is less than the predetermined torque, it is determined that the second predetermined condition is satisfied. In a fourth modification, in a case where the steering angle is less than the predetermined steering angle, it is determined that the second predetermined condition is satisfied. In a fifth modification, in a case where the slip angle is less than the predetermined slip angle, it is determined that the second predetermined condition is satisfied. In a sixth modification, in a case where the lateral load is less than the predetermined lateral load, it is determined that the second predetermined condition is satisfied. In a seventh modification, in a case where the yaw angle is less than the predetermined yaw angle, it is determined that the second predetermined condition is satisfied. In an eighth modification, in a case where the roll angle is less than the predetermined roll angle, it is determined that the second predetermined condition is satisfied. In a ninth modification, in a case where the pitch angle is less than the predetermined pitch angle, it is determined that the second predetermined condition is satisfied. In a tenth modification, in a case where the vertical load is over the predetermined the vertical load, it is determined that the second predetermined condition is satisfied. In an eleventh modification, in a case where the friction coefficient is over the predetermined the friction coefficient, it is determined that the second predetermined condition is satisfied. In a twelfth modification, in a case where the amplitude is less than the predetermined amplitude, it is determined that the second predetermined condition is satisfied. In a thirteenth modification, in a case where the state of charge of the battery BT is over the predetermined state of charge, it is determined that the second predetermined condition is satisfied. In a fourteenth modification, in a case where the air pressure of the tire T is over the predetermined air pressure, it is determined that the second predetermined condition is satisfied. In a fifteenth modification, in a case where the friction member 14A has a thickness over the predetermined thickness, it is determined that the second predetermined condition is satisfied. In a sixteenth modification, in a case where the heart rate is less than the predetermined heart rate, it is determined that the second predetermined condition is satisfied. In a seventeenth modification, in a case where the total weight is over the predetermined weight, it is determined that the second predetermined condition is satisfied.

The contents of the control executed by the electronic controller 22 can be modified. In one modification, the electronic controller 22 limits ABS control in a case where the first predetermined condition and the second predetermined condition are satisfied. Further, the electronic controller 22 does not execute ABS control in a case where the first predetermined condition and a third predetermined condition is satisfied. Specifically, in a case where the first predetermined condition and the second predetermined condition are satisfied, the electronic controller 22 limits ABS control so that ABS control is executed less frequently or so that ABS control is executed with a lower strength. The third predetermined condition is determined, for example, based on the limitation information. The third predetermined condition has as a threshold value that differs from the threshold value used for the second predetermined condition so that the third predetermined condition is satisfied after the second predetermined condition is satisfied.

The structure of the brake device 12 can be modified. In a first modification, the brake device 12 includes the brake unit 14, an actuator that drives the brake unit 14 with a fluid (not shown), and the electric drive unit 16 that drives the brake unit 14 by driving an actuator (pump). One modification of a fluid that is a power transmission medium is a hydraulic oil. The electric drive unit 16 drives the actuator so that the pressure of the fluid is added to the brake unit 14.

The brake unit 14 is configured to brake the rotation body DR of the human-powered vehicle A with the pressure of the fluid. In this modification, the brake device 12 is a hydraulic brake device. The brake device 12 and the operation device F can be connected hydraulically or electrically. In a second modification, the brake device 12 includes the brake unit 14, an actuator that drives the brake unit 14 by a cable (not shown), and the electric drive unit 16 that drives the actuator so as to drive the brake unit 14. The electric drive unit 16 is operated to drive the actuator so as to pull the cable. The brake unit 14 is configured to brake the rotation body DR of the human-powered vehicle A along with the pull of the cable. In this modification, the brake device 12 is a cable brake device. The brake device 12 and the operation device F can be connected mechanically or electrically. In the first modification and the second modification, the brake unit 14, the actuator, and the electric drive unit 16 can be accommodated in the same case or provided independently from one another on the human-powered vehicle A.

The human-powered vehicle A can be of any type. In a first modification, the human-powered vehicle A is a road bike, a mountain bike, a cross bike, a city cycle, a cargo bike, or a recumbent bicycle. In a second modification, the human-powered vehicle A is a kick scooter.

What is claimed is:

1. A brake control device comprising:
   an electronic controller configured to control a brake unit configured to brake a rotation body of a human-powered vehicle,
   the electronic controller being further configured to:
   determine whether a first predetermined condition and a second predetermined condition are each satisfied,
   execute an ABS control when the first predetermined condition is satisfied, the ABS control configured to control the brake unit to adjust a braking force acting on the rotation body,
   limit the ABS control when both the first predetermined condition for executing the ABS control and the second predetermined condition for limiting the ABS control are satisfied, and
   determine whether the first predetermined condition is satisfied based on different information than that used to determine whether the second predetermined condition is satisfied,
   the second predetermined condition being set based on limitation information that differs from information related to a traveling speed of the human-powered vehicle, and
   the electronic controller being configured to determine whether the second predetermined condition is satisfied based on at least one selected from the group consisting of: a relationship between a cadence input to a crank of the human-powered vehicle and a predetermined cadence, a relationship between a power input to the crank and a predetermined power, a relationship between a torque input to the crank and a predetermined torque, a relationship between a slip angle of the human-powered vehicle and a predetermined slip angle, a relationship between a steering angle of the human-powered vehicle and a predetermined steering angle, a relationship between a lateral load of the human-powered vehicle and a predetermined lateral load, a relationship between a yaw angle of the human-powered vehicle and a predetermined yaw angle, a relationship between a roll angle of the human-powered vehicle and a predetermined roll angle, a relationship between a pitch angle of the human-powered vehicle and a predetermined pitch angle, a relationship between a vertical load of the human-powered vehicle and a predetermined vertical load, a friction coefficient of a road surface, weather of a traveling environment of the human-powered vehicle, an amplitude of the road surface, a state of charge of a battery of the human-powered vehicle, a detected abnormality of a component of the human-powered vehicle, an air pressure of a tire of the human-powered vehicle, whether the tire is flat, a thickness of a friction member of the brake unit, a detected condition of a rider of the human-powered vehicle, a total weight of the human-powered vehicle, and a vehicle body specification of a component of the human-powered vehicle.

2. The brake control device according to claim 1, wherein the electronic controller is configured to limit the ABS control by not executing the ABS control when both the first predetermined condition and the second predetermined condition are satisfied.

3. The brake control device according to claim 1, wherein the electronic controller is configured to execute the ABS control without adding a limitation when the first predetermined condition is satisfied and the second predetermined condition is not satisfied.

4. The brake control device according to claim 1, wherein the electronic controller is configured to determine whether the second predetermined condition is satisfied based on at least one selected from the group consisting of: the relationship between the cadence input to the crank and the predetermined cadence, the relationship between the power input to the crank and the predetermined power, and the relationship between the torque input to the crank and the predetermined torque.

5. The brake control device according to claim 4, wherein the electronic controller is configured to determine the second predetermined condition is satisfied when the cadence input to the crank is greater than or equal to the predetermined cadence.

6. The brake control device according to claim 4, wherein the electronic controller is configured to determine the second predetermined condition is satisfied when the power input to the crank is greater than or equal to the predetermined power.

7. The brake control device according to claim 4, wherein the electronic controller is configured to determine the second predetermined condition is satisfied when the torque input to the crank is greater than or equal to the predetermined torque.

8. The brake control device according to claim 1, wherein the electronic controller is configured to determine whether the second predetermined condition is satisfied based on the relationship between the steering angle of the human-powered vehicle and the predetermined steering angle.

9. The brake control device according to claim 8, wherein the electronic controller is configured to determine the second predetermined condition is satisfied when the steering angle is greater than or equal to the predetermined steering angle.

10. The brake control device according to claim 1, wherein
    the electronic controller is configured to determine whether the second predetermined condition is satisfied based on the relationship between the slip angle of the human-powered vehicle and the predetermined slip angle.

11. The brake control device according to claim 10, wherein
the electronic controller is configured to determine the second predetermined condition is satisfied when the slip angle is greater than or equal to the predetermined slip angle.

12. The brake control device according to claim 1, wherein
the electronic controller is configured to determine whether the second predetermined condition is satisfied based on the relationship between the lateral load of the human-powered vehicle and the predetermined lateral load.

13. The brake control device according to claim 12, wherein
the electronic controller is configured to determine the second predetermined condition is satisfied when the lateral load is greater than or equal to the predetermined lateral load.

14. The brake control device according to claim 1, wherein
the electronic controller is configured to determine whether the second predetermined condition is satisfied based on the relationship between the yaw angle of the human-powered vehicle and the predetermined yaw angle.

15. The brake control device according to claim 14, wherein
the electronic controller is configured to determine the second predetermined condition is satisfied when the yaw angle is greater than or equal to the predetermined yaw angle.

16. The brake control device according to claim 1, wherein
the electronic controller is configured to determine whether the second predetermined condition is satisfied based on the relationship between the roll angle of the human-powered vehicle and the predetermined roll angle.

17. The brake control device according to claim 16, wherein
the electronic controller is configured to determine the second predetermined condition is satisfied when the roll angle is greater than or equal to the predetermined roll angle.

18. The brake control device according to claim 1, wherein
the electronic controller is configured to determine whether the second predetermined condition is satisfied based on the relationship between the pitch angle of the human-powered vehicle and the predetermined pitch angle.

19. The brake control device according to claim 18, wherein
the electronic controller is configured to determine the second predetermined condition is satisfied when the pitch angle is greater than or equal to the predetermined pitch angle.

20. The brake control device according to claim 1, wherein
the electronic controller is configured to determine whether the second predetermined condition is satisfied based on the relationship between the vertical load of the human-powered vehicle and the predetermined vertical load.

21. The brake control device according to claim 20, wherein
the electronic controller is configured to determine the second predetermined condition is satisfied when the vertical load is less than or equal to the predetermined vertical load.

22. The brake control device according to claim 1, wherein
the electronic controller is configured to determine whether the second predetermined condition is satisfied based on the friction coefficient of the road surface.

23. The brake control device according to claim 22, wherein
the electronic controller is configured to determine the second predetermined condition is satisfied when the friction coefficient is less than or equal to a predetermined friction coefficient.

24. The brake control device according to claim 1, wherein
the electronic controller is configured to determine whether the second predetermined condition is satisfied based on the weather of the traveling environment of the human-powered vehicle.

25. The brake control device according to claim 24, wherein
the electronic controller is configured to determine the second predetermined condition is satisfied when the weather is a predetermined weather.

26. The brake control device according to claim 1, wherein
the electronic controller is configured to determine whether the second predetermined condition is satisfied based on the amplitude of the road surface.

27. The brake control device according to claim 26, wherein
the electronic controller is configured to determine the second predetermined condition is satisfied when the amplitude is greater than or equal to a predetermined amplitude.

28. The brake control device according to claim 1, wherein
the electronic controller is configured to determine whether the second predetermined condition is satisfied based on the state of charge of the battery of the human-powered vehicle.

29. The brake control device according to claim 28, wherein
the electronic controller is configured to determine the second predetermined condition is satisfied when the state of charge of the battery is less than or equal to a predetermined state of charge.

30. The brake control device according to claim 1, wherein
the electronic controller is configured to determine whether the second predetermined condition is satisfied based on the detected abnormality of the component of the human-powered vehicle.

31. The brake control device according to claim 30, wherein
the electronic controller is configured to determine the second predetermined condition is satisfied when the component is in an abnormal state.

32. The brake control device according to claim 1, wherein
the electronic controller is configured to determine whether the second predetermined condition is satisfied based on the air pressure of the tire of the human-powered vehicle.

33. The brake control device according to claim 32, wherein
the electronic controller is configured to determine the second predetermined condition is satisfied when the air pressure of the tire is less than or equal to a predetermined air pressure.

34. The brake control device according to claim 1, wherein
the electronic controller is configured to determine whether the second predetermined condition is satisfied based on whether the tire is flat.

35. The brake control device according to claim 34, wherein
the electronic controller is configured to determine the second predetermined condition is satisfied when the tire is flat.

36. The brake control device according to claim 1, wherein
the electronic controller is configured to determine whether the second predetermined condition is satisfied based on the thickness of the friction member of the brake unit.

37. The brake control device according to claim 36, wherein
the electronic controller is configured to determine the second predetermined condition is satisfied when the thickness of the friction member is less than or equal to a predetermined thickness.

38. The brake control device according to claim 1, wherein
the electronic controller is configured to determine whether the second predetermined condition is satisfied based on the detected condition of the rider of the human-powered vehicle.

39. The brake control device according to claim 38, wherein
the the detected condition of the rider includes information related to a heart rate of the rider.

40. The brake control device according to claim 39, wherein
the electronic controller is configured to determine the second predetermined condition is satisfied when the heart rate is greater than or equal to a predetermined heart rate.

41. The brake control device according to claim 1, wherein
the electronic controller is configured to determine the first predetermined condition is satisfied when a slip rate of a wheel on which the rotation body is provided is greater than or equal to a predetermined slip rate.

42. A braking system comprising the brake control device according to claim 1, and the braking system further comprising:
the brake unit; and
an electric drive unit configured to drive the brake unit.

43. The braking system according to claim 42 further comprising
an electric assist unit configured to assist propulsion of the human-powered vehicle.

44. The brake control device according to claim 1, wherein
the electronic controller is configured to limit the ABS control by executing the ABS control less frequently or executing the ABS control with a lower strength than when the ABS control is not limited.

* * * * *